(12) United States Patent
Lee et al.

(10) Patent No.: US 8,065,114 B2
(45) Date of Patent: Nov. 22, 2011

(54) UBIQUITOUS MONITORING SYSTEM

(75) Inventors: Byoung Hoon Lee, Suwon-si (KR); Sung Hwa Lim, Bucheon-si (KR); Jai Hoon Kim, Seongnam-si (KR); We Duke Cho, Seongnam-si (KR)

(73) Assignee: Ajou University Industry Cooperation Foundation, Gyeonggi-Do (KR)

( * ) Notice: Subject to any disclaimer, the term of this patent is extended or adjusted under 35 U.S.C. 154(b) by 0 days.

(21) Appl. No.: 13/056,716

(22) PCT Filed: Sep. 19, 2008

(86) PCT No.: PCT/KR2008/005539
§ 371 (c)(1),
(2), (4) Date: Feb. 10, 2011

(87) PCT Pub. No.: WO2010/013862
PCT Pub. Date: Feb. 4, 2010

(65) Prior Publication Data
US 2011/0131013 A1 Jun. 2, 2011

(30) Foreign Application Priority Data
Jul. 31, 2008 (KR) .................. 10-2008-0075110

(51) Int. Cl.
G06F 17/40 (2006.01)
G06F 19/00 (2006.01)
(52) U.S. Cl. .................. 702/187; 340/870.06; 709/218; 709/238

(58) Field of Classification Search .............. 73/732.1, 73/865.8, 865.9, 866.3; 340/500, 540, 679; 702/1, 33, 34, 127, 182, 183, 184, 185, 187, 702/188, 189; 709/217, 218, 219, 238, 239, 709/240, 241, 242, 243, 244
See application file for complete search history.

(56) References Cited

U.S. PATENT DOCUMENTS
2,883,255 A * 4/1959 Anderson .................. 346/34
(Continued)

FOREIGN PATENT DOCUMENTS
KR 10-2006-0057927 5/2006
(Continued)

OTHER PUBLICATIONS
Written Opinion and International Search Report in PCT/KR2008/005539 dated Apr. 24, 2009.

*Primary Examiner* — Edward Cosimano
(74) *Attorney, Agent, or Firm* — Harness, Dickey & Pierce, P.L.C.; Anthony G. Fussner; Kisuk Lee

(57) ABSTRACT

There is provided a ubiquitous monitoring system comprising a plurality of sensor nodes, one or more agent adapters receiving sensing data from the plurality of sensor nodes and determining to where the sensing data is transmitted according to one of characteristics of the plurality of sensing nodes and characteristics of the sensing data, one or more first monitoring agents receiving the sensing data from the agent adapter, one or more second monitoring agents receiving the sensing data from one of the agent adapter and the first monitoring agent, one or more third monitoring agents receiving the sensing data from one of the agent adapter and the second monitoring agent, and a monitoring engine receiving the sensing data from the third monitoring agent and monitoring the received sensing data.

8 Claims, 2 Drawing Sheets

U.S. PATENT DOCUMENTS

| | | | | |
|---|---|---|---|---|
| 3,321,613 A | * | 5/1967 | Searle | 702/182 |
| 3,351,910 A | * | 11/1967 | Miller et al. | 714/47.1 |
| 3,516,072 A | * | 6/1970 | Wallace, Jr. | 702/188 |
| 3,534,337 A | * | 10/1970 | Martin et al. | 702/188 |
| 4,752,950 A | * | 6/1988 | Le Carpentier | 379/106.11 |
| 4,873,517 A | * | 10/1989 | Baratz et al. | 370/236 |
| 4,905,233 A | * | 2/1990 | Cain et al. | 370/237 |
| 6,097,727 A | * | 8/2000 | Peters | 370/400 |
| 7,139,834 B1 | * | 11/2006 | Albanese et al. | 709/238 |
| 7,233,574 B2 | * | 6/2007 | Worfolk et al. | 370/238 |
| 7,825,791 B2 | * | 11/2010 | Kim et al. | 340/500 |
| 7,826,372 B1 | * | 11/2010 | Mabe et al. | 370/237 |
| 7,920,512 B2 | * | 4/2011 | Maltseff et al. | 370/328 |
| 2002/0165957 A1 | * | 11/2002 | Devoe et al. | 709/224 |
| 2003/0128687 A1 | * | 7/2003 | Worfolk et al. | 370/351 |
| 2006/0282498 A1 | * | 12/2006 | Muro | 709/203 |
| 2007/0103298 A1 | * | 5/2007 | Kim et al. | 340/539.22 |
| 2008/0291925 A1 | * | 11/2008 | Fisher et al. | 370/400 |
| 2009/0059842 A1 | * | 3/2009 | Maltseff et al. | 370/328 |
| 2010/0034090 A1 | * | 2/2010 | Bader et al. | 370/236 |

FOREIGN PATENT DOCUMENTS

| | | |
|---|---|---|
| KR | 10-2007-0044200 | 4/2007 |
| KR | 10-0715681 | 5/2007 |
| KR | 20-2008-0001962 | 6/2008 |

* cited by examiner

UBIQUITOUS MONITORING SYSTEM

CROSS-REFERENCE TO RELATED APPLICATIONS

This application is a national phase application of PCT Application No. PCT/KR2008/005539 filed on Sep. 19, 2008, which claims the benefit and priority to Korean Patent Application No. 10-2008-013862 filed Jul. 31, 2008. The entire disclosures of the applications identified in this paragraph are incorporated herein by references.

TECHNICAL FIELD

The present invention relates to a ubiquitous monitoring system, and more particularly, to a ubiquitous monitoring system capable of accomplishing scalability with respect to sensing nodes within a range of processing sensing data within a deadline thereof.

BACKGROUND ART

Source monitoring systems with scalability have been applied to be used before intelligent system monitoring, scheduling, load balancing, and tasks. Such technology provides scalability and Fault-Tolerant technique but is not suitable to satisfy conditions for various deadlines existing in a real-time system. Software modules for monitoring information on a status of an embedded device have performed using kernel wrapper technique. Such technique may improve implantation of a monitoring system in other systems and reduce time for designing the monitoring system. However, since there is an overhead required in wrapping a kernel, such technique is not suitable for real-time mass monitoring.

DETAILED DESCRIPTION OF THE INVENTION

Technical Problem

The present invention provides a ubiquitous monitoring system capable of accomplishing scalability with respect to sensing nodes within a range of processing sensing data within a deadline.

Technical Solution

According to an aspect of the present invention, there is provided a ubiquitous monitoring system including: a plurality of sensor nodes; one or more agent adapters receiving sensing data from the plurality of sensor nodes and determining to where the sensing data is transmitted according to one of the characteristics of the plurality of sensing nodes and characteristics of the sensing data; one or more first monitoring agents receiving the sensing data from the agent adapter; one or more second monitoring agents receiving the sensing data from one of the agent adapter and the first monitoring agent; one or more third monitoring agents receiving the sensing data from one of the agent adapter and the second monitoring agent; and a monitoring engine receiving the sensing data from the third monitoring agent and monitoring the received sensing data. The one or more agent adapters may transmit the sensing data to one of the first to third monitoring agents, according to a deadline of the sensing data received from the plurality of sensor nodes. The one or more agent adapters transmit the sensing data to one of the first to third monitoring agents, based on a type of a sensor node, an identifier of a sensor node, or a generation period of the sensing data.

Advantageous Effects

A ubiquitous monitoring system according to an embodiment of the present invention may accomplish scalability with respect to sensing nodes within a range of processing sensing data within a deadline thereof.

BEST MODE FOR CARRYING OUT THE INVENTION

Figure 1:
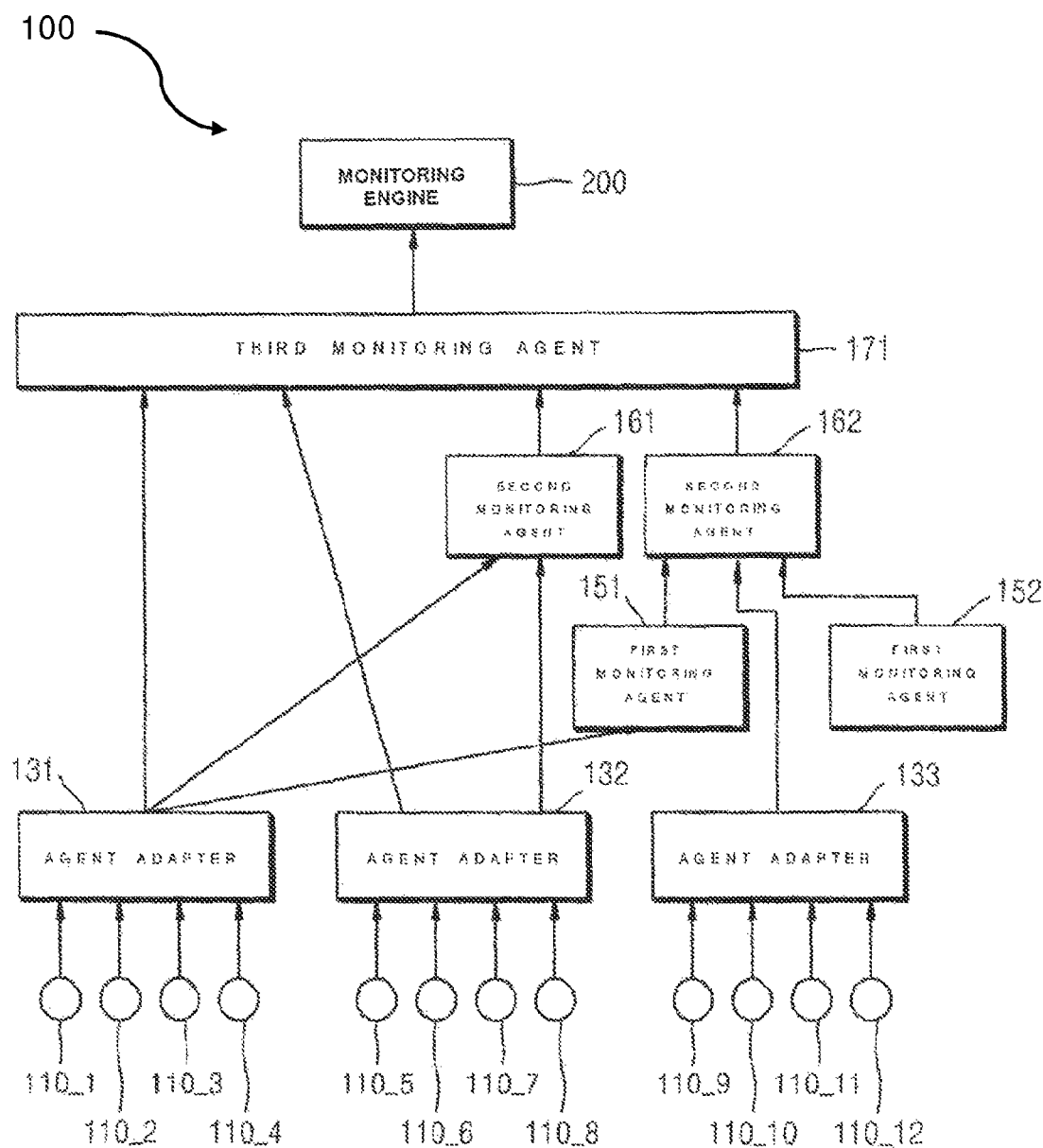
FIG. 1 is a block diagram illustrating a ubiquitous monitoring system according to an embodiment of the present invention.

To fully understand advantages of operations of the present invention and the objects obtained by embodiments of the present invention, it is required to refer to attached drawings illustrating preferable embodiments of the present invention and contents shown in the drawings. Hereinafter, the preferable embodiments of the present invention will be described in detail with reference to the attached drawings. The same reference numerals shown in each drawing indicate the same elements.

FIG. 1 is a block diagram illustrating a ubiquitous monitoring system 100 according to an embodiment of the present invention.

Referring to FIG. 1, the system 100 includes a plurality of sensor nodes 110_1 to 110_12, one or more agent adapters 131, 132, and 133, one or more first monitoring agents 151 and 152, one or more second monitoring agents 161 and 162, one or more third monitoring agents 171, and a monitoring engine 200.

The plurality of sensor nodes 110_1 to 110_12 are installed in a ubiquitous space and sense various data generated therein. For example, the sensor nodes 110_1 to 110_12 may sense various data such as temperature, humidity, and illuminance.

The one or more agent adapters 131, 132, and 133 receive sensing data from the sensor nodes 110_1 to 110_12 and determine where the sensing data is transmitted, according to one of characteristics of the sensor nodes 110_1 to 110_12 and characteristics of the sensing data. That is, it is determined to transmit the sensing data to one of the first monitoring agents 151 and 152, the second monitoring agents 161 and 162, and the third monitoring agent 171. The first monitoring agents 151 and 152 receive sensing data from the agent adapters 131, 132, and 133. The second monitoring agents 161 and 162 receive sensing data from one of the agent adapters 131, 132, and 133 and the first monitoring agents 151 and 152. The third monitoring agent 171 receives sensing data from one of the agent adapters 131, 132, and 133 and the second monitoring agent 161 and 162. The monitoring engine 200 receives sensing data from the third monitoring agent 171 and monitors the received sensing data.

The agent adapters 131, 132, and 133 transmit sensing data to one of the first to third monitoring agents 151, 152, 161, 162, and 171, according to a deadline of sensing data received from the sensor nodes 110_1 to 110_12. The agent adapters 131, 132, and 133 transmit sensing data with a short deadline to the third monitoring agent 171 directly, thereby quickly transmitting the sensing data with a short deadline to the monitoring engine.

On the other hand, the agent adapters 131, 132, and 133 transmit real-time sensing data with a long deadline or non-real-time sensing data to one of the first monitoring agents 151 and 152 and the second monitoring agents 161 and 162, thereby allowing the real-time sensing data with a long deadline or the non-real-time sensing data to pass through two or more monitoring agents. That is, sensing data transmitted to the first monitoring agents 151 and 152 passes through the second monitoring agents 161 and 162 and the third monitoring agent 171 and is forward to the monitoring engine 200. Sensing data transmitted to the second monitoring agents 161 and 162 passes through the third monitoring agent 171 and is forward to the monitoring engine 200. Accordingly, sensing data with a long deadline is processed a little more slowly than sensing data with a short deadline.

For example, the agent adapters 131, 132, and 133 may transmit sensing data to the first monitoring agents 151 and 152 when a deadline of the sensing data is longer than a delay time of the first monitoring agents 151 and 152 and shorter than a sum of the delay time of the first monitoring agents 151 and 152 and a delay time of the second monitoring agents 161 and 162.

Also, when a deadline of sensing data is longer than the sum of the delay time of the first monitoring agents 151 and 152 and the delay time of the second monitoring agents 161 and 162 and shorter than a sum of the delay time of the first monitoring agents 151 and 152, the delay time of the second monitoring agents 161 and 162, and a delay time of the third monitoring agent 171, the sensing data may be transmitted to the second monitoring agents 161 and 162. Also, when a deadline of sensing data is longer than the sum of the delay time of the first monitoring agents 151 and 152, the delay time of the second monitoring agents 161 and 162, and the delay time of the third monitoring agent 171, the sensing data may be transmitted to the third monitoring agent 171.

When all sensing data have to pass through three types of monitoring agents, the number of sensor nodes capable of being connected to one monitoring system may be increased. However, it is not possible to process real-time sensing data with a long deadline within the deadline thereof. Also, when all sensing data have to be one monitoring agent, the sensing data may be processed in a deadline thereof. However, the number of sensor nodes capable of being connected to one monitoring system may be reduced.

With respect to this, the system 100 allows sensing data with a short deadline to pass through one monitoring agent and allows sensing data with a long deadline to pass through two or more monitoring agents, based on a deadline of sensing data. Accordingly, the number of sensing nodes capable of being connected to one monitoring system, within a range of processing sensing data within a deadline thereof, may be increased. That is, the system may accomplish scalability with respect to sensing nodes within the range of processing sensing data within a deadline thereof.

On the other hand, the agent adapters 131, 132, and 133 may determine to transmit sensing data to one of the first monitoring agents 151 and 152, the second monitoring agents 161 and 162, and the third monitoring agent 171, based on a type of a sensor node, an identifier of a sensor node, or a generation period of the sensing data. For example, when the system monitors to sense a fire, a deadline of a temperature sensor node should be short. In this case, the agent adapters 131, 132, and 133 identify types of the sensor nodes 110_1 to 110_12 and may transmit sensing data of a temperature sensor node to the third monitoring agent 171 directly.

Also, based on identifiers of the sensor nodes 110_1 to 110_12, the agent adapters 131, 132, and 133 may recognize positions of the sensor nodes 110_1 to 110_12. Based on this, sensing data of a sensor node in a certain position may be transmitted to the third monitoring agent 171 directly. Also, the agent adapters 131, 132, and 133 may transmit sensing data whose data generation period should be short, to the third monitoring agent 171 directly and may transmit sensing data whose data generation period can be long, to the first monitoring agents 151 and 152. On the other hand, though monitoring agents are arranged in three stages in FIG. 1, monitoring agents may be arranged in Nth (N indicates a natural number) stages.

Figure 2:
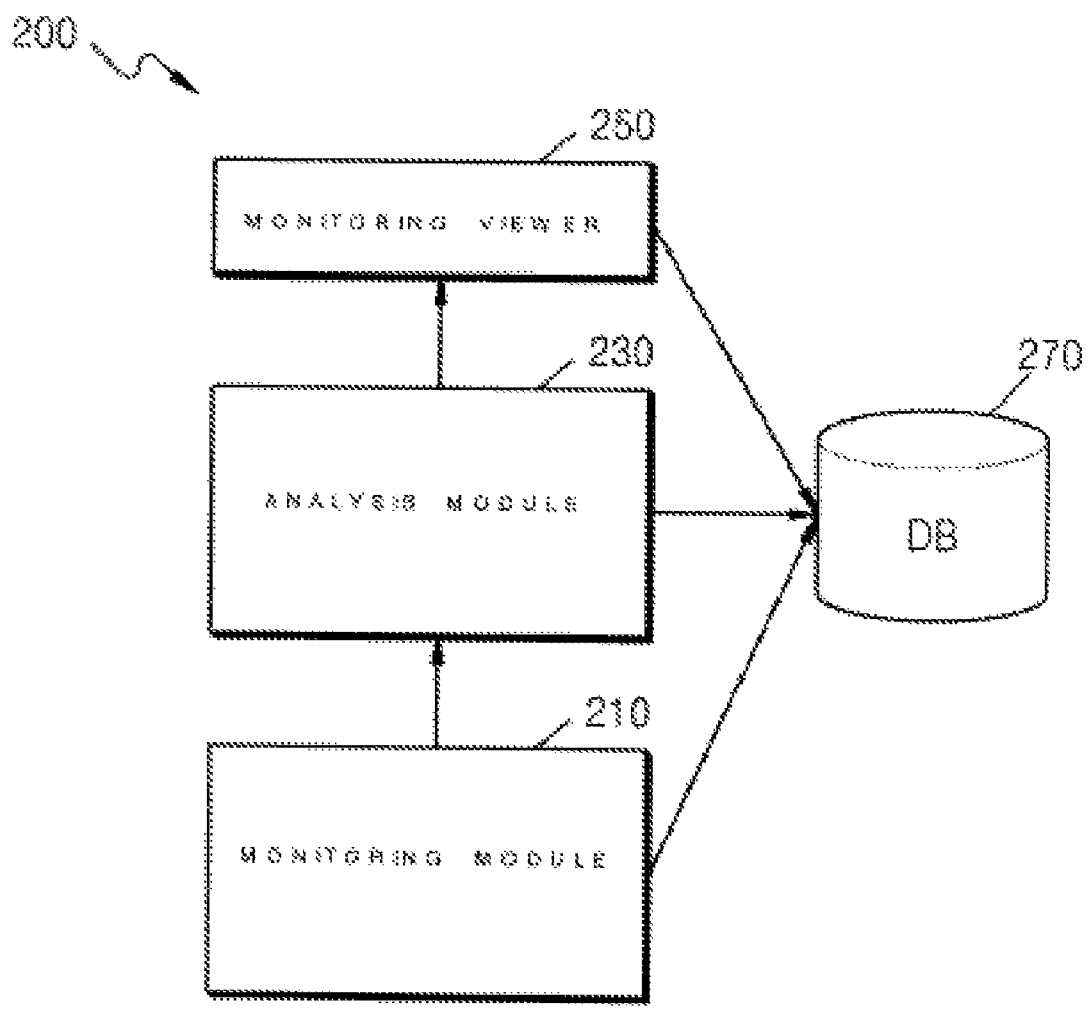
FIG. 2 is a block diagram illustrating a monitoring engine shown in FIG. 1.

FIG. 2 is a block diagram illustrating the monitoring engine 200.

Referring to FIG. 2, the monitoring engine 200 may include a monitoring module 210, an analysis module 230, a monitoring viewer 250, and a database 270.

The monitoring module 210 collects sensing data from one or more third monitoring agents 171. The monitoring module 210 may modify a format of the collected sensing data into a data format capable of being recognized by the monitoring engine 200. The analysis module 230 monitors based on sensing data and transmits a result of the monitoring to the monitoring viewer 250. The monitoring viewer 250 displays the result of the monitoring to a user. The monitoring module 210, the analysis module 230, and the monitoring viewer 250 may store operation logs or collected sensing data in the database 270.

As described above, exemplary embodiments have been shown and described. Though specific terms are used herein, they are just used for describing the present invention but do not limit the meanings and the scope of the present invention disclosed in the claims. Therefore, it would be appreciated by those skilled in the art that changes may be made to these embodiments without departing from the principles and spirit of the invention. Accordingly, the technical scope of the present invention is defined by the claims and their equivalents.

INDUSTRIAL APPLICABILITY

The present invention may be applied to the field of monitoring systems using ubiquitous technology.

What is claimed is:

1. A ubiquitous monitoring system comprising:
a plurality of sensor nodes;
one or more agent adapters receiving sensing data from the plurality of sensor nodes and determining where the sensing data is transmitted, according to one of characteristics of the plurality of sensing nodes and characteristics of the sensing data;
one or more first monitoring agents receiving the sensing data from the agent adapter;
one or more second monitoring agents receiving the sensing data from one of the agent adapter and the first monitoring agent;
one or more third monitoring agents receiving the sensing data from one of the agent adapter and the second monitoring agent; and
a monitoring engine receiving the sensing data from the third monitoring agent and monitoring the received sensing data.

2. The system of claim 1, wherein the one or more agent adapters transmit the sensing data to one of the first to third monitoring agents, based on a type of a sensor node, an identifier of a sensor node, or a generation period of the sensing data.

3. The system of claim 1, wherein the monitoring engine comprises:
   a monitoring module collecting sensing data from the one or more third monitoring agents;
   an analysis module monitoring based on the sensing data and transmitting a result of the monitoring;
   a database storing one or more of the sensing data and a log of the result of the monitoring; and
   a monitoring viewer displaying the result of the monitoring.

4. The system of claim 1, wherein the one or more agent adapters transmit the sensing data to one of the first to third monitoring agents, according to a deadline of the sensing data received from the plurality of sensor nodes.

5. The system of claim 4, wherein the one or more agent adapters transmit the sensing data to the first monitoring agent when the deadline of the sensing data is longer than a delay time of the first monitoring agent and shorter than a sum of the delay time of the first monitoring agent and a delay time of the second monitoring agent;
   the one or more agent adapters transmit the sensing data to the second monitoring agent when the deadline of the sensing data is longer than the sum of the delay time of the first monitoring agent and the delay time of the second monitoring agent and shorter than a sum of the delay time of the first monitoring agent, the delay time of the second monitoring agent, and a delay time of the third monitoring agent; and
   the one or more agent adapters transmit the sensing data to the third monitoring agent when the deadline of the sensing data is longer than the sum of the delay time of the first monitoring agent, the delay time of the second monitoring agent, and the delay time of the third monitoring agent.

6. A ubiquitous monitoring system comprising:
   a plurality of sensor nodes;
   one or more agent adapters receiving sensing data from the sensor nodes and determining where the sensing data is transmitted, according to one of characteristics of the sensor nodes and characteristics of the sensing data;
   first to Nth monitoring agents where N indicates a natural number; and
   a monitoring engine receiving the sensing data from the Nth monitoring agent and monitoring the received sensing data,
   wherein the first monitoring agent receives the sensing data from the agent adapter, and
   a jth monitoring agent receives the sensing data from one of the agent adapter and a j−1th monitoring agent where j indicates a natural number between 2 and N, inclusive.

7. The system of claim 6, wherein the one or more agent adapters transmit the sensing data to one of the first to Nth monitoring agents, according to a deadline of the sensing data received from the sensor node.

8. The system of claim 6, wherein the one or more agent adapters transmit the sensing data to one of the first to Nth monitoring agents, based on a type of a sensor node, an identifier of a sensor node, or a generation period of the sensing data.

* * * * *

UNITED STATES PATENT AND TRADEMARK OFFICE
CERTIFICATE OF CORRECTION

PATENT NO. : 8,065,114 B2
APPLICATION NO. : 13/056716
DATED : November 22, 2011
INVENTOR(S) : Byoung Hoon Lee et al.

It is certified that error appears in the above-identified patent and that said Letters Patent is hereby corrected as shown below:

The Claims should be amended to:

(1) Column 4, lines 66-67 through Column 5 lines 1 -3, (Claim 2) replace The system of claim 1, wherein the one or more agent adapters transmit the sensing data to one of the first to third monitoring agents, based on a type of a sensor node, an identifier of a sensor node, or a generation period of the sensing data. with The system of claim 1, wherein the one or more agent adapters transmit the sensing data to one of the first to third monitoring agents, according to a deadline of the sensing data received from the plurality of sensor nodes.

(2) Column 5, lines 4-13, (Claim 3) replace The system of claim 1, wherein the monitoring engine comprises: a monitoring module collecting sensing data from the one or more third monitoring agents; an analysis module monitoring based on the sensing data and transmitting a result of the monitoring; a database storing one or more of the sensing data and a log of the result of the monitoring; and a monitoring viewer displaying the result of the monitoring. with The system of claim 2, wherein the one or more agent adapters transmit the sensing data to the first monitoring agent when the deadline of the sensing data is longer than a delay time of the first monitoring agent and shorter than a sum of the delay time of the first monitoring agent and a delay time of the second monitoring agent; the one or more agent adapters transmit the sensing data to the second monitoring agent when the deadline of the sensing data is longer than the sum of the delay time of the first monitoring agent and the delay time of the second monitoring agent and shorter than a sum of the delay time of the first monitoring agent, the delay time of the second monitoring agent, and a delay time of the third monitoring agent; and

Signed and Sealed this
Fifteenth Day of May, 2012

David J. Kappos
*Director of the United States Patent and Trademark Office*

CERTIFICATE OF CORRECTION (continued)
U.S. Pat. No. 8,065,114 B2

The Claims should be amended to:

the one or more agent adapters transmit the sensing data to the third monitoring agent when the deadline of the sensing data is longer than the sum of the delay time of the first monitoring agent, the delay time of the second monitoring agent, and the delay time of the third monitoring agent.

(3) Column 5, lines 14-17, (Claim 4) replace The system of claim 1, wherein the one or more agent adapters transmit the sensing data to one of the first to third monitoring agents, according to a deadline of the sensing data received from the plurality of sensor nodes. with The system of claim 1, wherein the one or more agent adapters transmit the sensing data to one of the first to third monitoring agents, based on a type of a sensor node, an identifier of a sensor node, or a generation period of the sensing data.

(4) Column 5, lines 18-32 through Column 6 lines 1-6, (Claim 5) replace The system of claim 4, wherein the one or more agent adapters transmit the sensing data to the first monitoring agent when the deadline of the sensing data is longer than a delay time of the first monitoring agent and shorter than a sum of the delay time of the first monitoring agent and a delay time of the second monitoring agent; the one or more agent adapters transmit the sensing data to the second monitoring agent when the deadline of the sensing data is longer than the sum of the delay time of the first monitoring agent and the delay time of the second monitoring agent and shorter than a sum of the delay time of the first monitoring agent, the delay time of the second monitoring agent, and a delay time of the third monitoring agent; and the one or more agent adapters transmit the sensing data to the third monitoring agent when the deadline of the sensing data is longer than the sum of the delay time of the first monitoring agent, the delay time of the second monitoring agent, and the delay time of the third monitoring agent. with The system of claim 1, wherein the monitoring engine comprises: a monitoring module collecting sensing data from the one or more third monitoring agents; an analysis module monitoring based on the sensing data and transmitting a result of the monitoring; a database storing one or more of the sensing data and a log of the result of the monitoring; and a monitoring viewer displaying the result of the monitoring.